United States Patent
Bewsher et al.

(10) Patent No.: US 12,258,469 B2
(45) Date of Patent: Mar. 25, 2025

(54) AQUEOUS BIOPOLYMER DISPERSIONS

(71) Applicant: Aquaspersions Limited, Halifax (GB)

(72) Inventors: Alan Bewsher, Ripponden (GB); Paul Smith, Halifax (GB); Jade Rowley, Pontefract (GB)

(73) Assignee: Aquaspersions Limited, Halifax (GB)

( * ) Notice: Subject to any disclaimer, the term of this patent is extended or adjusted under 35 U.S.C. 154(b) by 22 days.

(21) Appl. No.: 18/011,802

(22) PCT Filed: Jul. 2, 2021

(86) PCT No.: PCT/EP2021/068418
§ 371 (c)(1),
(2) Date: Dec. 20, 2022

(87) PCT Pub. No.: WO2022/003195
PCT Pub. Date: Jan. 6, 2022

(65) Prior Publication Data
US 2023/0235166 A1  Jul. 27, 2023

(30) Foreign Application Priority Data
Jul. 2, 2020 (EP) .................... 20183822

(51) Int. Cl.
| C08L 29/04 | (2006.01) |
| B29C 71/02 | (2006.01) |
| C08J 7/04 | (2020.01) |
| C08K 5/092 | (2006.01) |
| C08L 67/02 | (2006.01) |
| C09D 167/02 | (2006.01) |
| C09D 167/04 | (2006.01) |

(52) U.S. Cl.
CPC .............. *C08L 67/02* (2013.01); *C08J 7/04* (2013.01); *C08J 7/08* (2013.01); *C08K 5/092* (2013.01); *C09D 167/02* (2013.01); *C08J 2301/02* (2013.01); *C08J 2367/02* (2013.01)

(58) Field of Classification Search
CPC ............................ C08L 29/04; C09D 167/04
See application file for complete search history.

(56) References Cited

U.S. PATENT DOCUMENTS

| 5,288,318 A * | 2/1994 | Mayer ................. C08L 3/02 106/162.7 |
| 10,047,210 B2 * | 8/2018 | Hernandez-Torres ....... C08L 67/02 |
| 2011/0293957 A1 * | 12/2011 | Johansson ............. C08L 3/02 428/533 |
| 2013/0225761 A1 * | 8/2013 | Whitehouse ........ B29B 7/7495 524/599 |
| 2017/0247537 A1 * | 8/2017 | Hipps, Sr. ............ C09D 167/00 |
| 2018/0171559 A1 * | 6/2018 | Hipps, Sr. ............ D21H 19/34 |
| 2020/0002572 A1 * | 1/2020 | Spender ............... C09D 191/00 |
| 2022/0010179 A1 * | 1/2022 | Spender ..................... C08L 1/08 |

FOREIGN PATENT DOCUMENTS

| CN | 104619748 A | 5/2015 |
| CN | 107163795 A | 9/2017 |
| CN | 107418170 A | 12/2017 |
| CN | 107698811 A | 2/2018 |
| CN | 109071828 A | 12/2018 |
| CN | 109867819 A * | 6/2019 |
| CN | 110256919 A | 9/2019 |
| CN | 110885595 A | 3/2020 |
| EP | 2631060 A1 | 8/2013 |
| EP | 1566409 B1 | 6/2016 |
| EP | 3560996 A1 | 10/2019 |
| FR | 3076744 B1 | 1/2021 |
| WO | WO-02085969 A2 | 10/2002 |
| WO | WO-2005052075 A1 | 6/2005 |
| WO | WO2006/120523 A1 | 11/2006 |
| WO | WO-2008007919 A1 | 1/2008 |
| WO | WO-2010013483 A1 | 2/2010 |
| WO | WO-2014017715 A1 | 1/2014 |
| WO | WO-2015059709 A1 | 4/2015 |
| WO | WO-2016067285 A1 | 5/2016 |
| WO | WO2017/151595 A1 | 9/2017 |
| WO | WO2018/119083 A1 | 6/2018 |
| WO | WO-2018184897 A1 | 10/2018 |
| WO | WO-2018184898 A1 | 10/2018 |
| WO | WO-2019094738 A1 | 5/2019 |
| WO | WO-2020036843 A1 | 2/2020 |
| WO | WO-2020242872 A1 | 12/2020 |
| WO | WO2022/003195 A1 | 1/2022 |

OTHER PUBLICATIONS

International Search Report dated Oct. 25, 2021 issued in International Application No. PCT/EP2021/068418.
Written Opinion of the International Searching Authority dated Oct. 25, 2021 in International Patent Application No. PCT/EP2021/068418.
TW Examination report dated Nov. 12, 2024, issued in TW Application No. 110124502, with English Translation.

* cited by examiner

*Primary Examiner* — Cachet I Proctor
(74) *Attorney, Agent, or Firm* — Weaver Austin Villeneuve & Sampson LLP

(57) ABSTRACT

An aqueous biopolymer dispersion composition comprising: a biopolymer selected from the group consisting of: polybutylene adipate terephthalate (PBAT), polybutylene succinate (PBS), polybutylene succinate adipate (PBSA), polylactic acid (PLA), poly(3-hydroxybutyrate) (PHB), polycaprolactone (PCL), poly(3-hydroxybutyrate-co-3-hydroxyhexanoate) (PHBH); poly(3-hydroxybutyrate-co-3-hydroxyvalerate) (PHBV), polyhydroxyalkanoate (PHA), and mixtures thereof; a stabilising agent selected from the group consisting of: polyvinyl alcohol, fatty alcohol ethoxylates, ethylene oxide/propylene oxide (EO/PO) block copolymers, salts of fatty acids and mixtures thereof; a rheology modifier; a cross linking agent; optional further ingredients; and water.

19 Claims, No Drawings

AQUEOUS BIOPOLYMER DISPERSIONS

This invention relates to biopolymer dispersion compositions, coatings using the dispersions and products made using the coatings. The invention relates particularly, but not exclusively, to compositions for making barrier coatings on substrates, for example paper, paperboard, other cellulosic materials and biopolymer films.

Aqueous polymer dispersions find a wide variety of applications, for example as adhesives, binders, rising agents, sealants, primers, inks, paints, seed coating systems and paper coatings. Such dispersions are also used in pharmaceutical dosage forms, medical testing kits and in cosmetic formulations. A major use has been to form thin barrier coatings on paper, paperboard packaging, plastic films and containers. However, synthetic polymers which have been commonly used are difficult to recycle and are not biodegradable to facilitate environmentally acceptable disposal.

Biodegradable polymers have been used but may be difficult to process, for example by extrusion into thin films. Likewise, formation of films from solvent solutions of biopolymers is problematic due to toxicity, flammability and environmental pollution.

Accordingly, there is a need for a biodegradable polymer composition, referred to in this specification as a "biopolymer", which may be applied to cellulosic or other substrates to enable the resultant composite to be recyclable or compostable.

Existing biopolymer dispersions have the disadvantage of poor water resistance and a liability to blanch in use.

WO2017/019914 discloses aqueous biodegradable polymer dispersions, including polyvinyl alcohol as a stabilising agent and xanthan gum as a rheology modifier.

According to a first aspect of the present invention, an aqueous biopolymer dispersion composition comprises:
a biopolymer selected from the group consisting of polybutylene adipate terephthalate (PBAT), polybutylene succinate (PBS), polybutylene succinate adipate (PBSA), polylactic acid (PLA), poly(3-hydroxybutyrate) (PHB), polycaprolactone (PCL), poly(3-hydroxybutyrate-co-3-hydroxyhexanoate) (PHBH), poly(3-hydroxybutyrate-co-3-hydroxyvalerate) (PHBV), polyhydroxyalkanoate (PHA) and mixtures thereof;
a stabilising agent selected from the group consisting of: polyvinyl alcohol, fatty alcohol ethoxylates, ethylene oxide/propylene oxide (EO/PO) block copolymers, salts of fatty acids and mixtures thereof;
a rheology modifier;
a cross linking agent;
optional further ingredients; and
water.

Compositions of the present invention are preferably free or substantially free of volatile organic solvents.

In preferred embodiments the biopolymer and other components of the composition are approved for use for food contact applications.

The biopolymer may be a polyester or a copolymer or blend thereof.

In embodiments in which a mixture of biopolymers is used, a mixture of two biopolymers is preferred.

The biopolymer may be present in the dispersion in an amount of about 10 wt % to about 80 wt %, preferably about 15 wt % to about 65 wt %, more preferably about 20 wt % to about 40 wt %, and more preferably about 30 wt % to about 40 wt % based on the total weight of the aqueous dispersion.

A lower amount of biopolymer may be used if a wax or tackifier is present in the composition.

Exemplary stabilising agents are selected from polyvinyl alcohol, fatty alcohol ethoxylates, ethylene oxide/propylene oxide (EO/PO) block copolymers and mixtures thereof, salts of fatty acids, the stabilising agent is preferably polyvinyl alcohol.

The polyvinyl alcohol may have a molecular weight in the range of 25,000 to 200,000 g/mol and a degree of hydrolysis (HD) of 70% to 98%. A blend of polyvinyl alcohol polymers may be employed.

The stabilising agent may be present in the dispersion in an amount of about 1 wt % to about 6 wt %, preferably about 2 wt % to about 4 wt %, more preferably about 2 wt % to about 3 wt %.

The rheology modifier may be selected from the group consisting of: xanthan gum, cellulose ether, carboxymethyl cellulose, guar, polysaccharides, associative thickeners such fully hydrolysed polyacrylic acid, and polyurethane thickeners, and mixtures thereof.

The rheology modifier may be present in the dispersion in an amount from about 0.05 wt % to about 3 wt %.

A preferred rheology modifier is xanthan gum.

The cross-linking agent may be a carboxylic acid or aldehyde preferably a bifunctional carboxylic acid or bifunctional aldehyde. The cross-linking agent may be stable during storage but is activated by drying or heating to crosslink the emulsifier.

Exemplary cross-linking agents may be selected from the group consisting of: oxalic acid, malonic acid, succinic acid, glutaric acid, pimelic acid, suberic acid, azelaic acid, sebacic acid, undecanedioic acid, dodecanedioic acid, brassylic acid, thapsic acid, japanic acid, phellogenic acid, equisetolic acid, maleic acid, fumaric acid, acetylene dicarboxylic acid, glutaconic acid, traumatic acid, muconic acid, glutinic acid, citraconic acid, mesaconic acid, itaconic acid, tartronic acid, mesoxalic acid, malic acid, tartaric acid, oxaloacetic acid, aspartic acid, α-hydroxyglutaric acid, arabinaric acid, acetone dicarboxylic acid, α-ketoglutaric acid, glutamic acid, diaminopimelic acid, saccharic acid, malondialdehyde, succinaldehyde, glutaraldehyde, isocitric acid, aconitric acid, propane-1,2,3-tricarboxylic acid, trimesic acid and mixtures thereof.

Preferred cross linking agents may be selected from the group consisting of: adipic acid, maleic acid, glyoxal, citric acid and mixtures thereof.

The cross-linking agent may be present in an amount of about 0.05 wt % to about 3 wt %.

When the cross-linking agent is glyoxal, the amount may be from about 0.05 wt % to about 0.2 wt %.

When the cross-linking agent is citric acid the amount may be from about 0.3 wt % up to about 2 wt %, preferably about 0.5 wt %.

When the cross-linking agent is maleic acid the amount may be from about 0.3 wt % up to about 3 wt %, preferably about 1 wt %.

When the cross-linking agent is adipic acid, the amount may be from about 0.1 wt % to about 1.5 wt %, preferably about 0.5 wt % to about 1.0 wt %.

The amount of crosslinker employed may be higher than a stoichiometric amount. A factor affecting the amount of crosslinking is the curing time. Cure times may be short, for example about 1 minute, but longer periods may be employed dependent on the crosslinker used. As the films may dry quickly this property may also reduce the mobility of the crosslinkers, reducing the rate of crosslinking. Adipic acid is sparingly soluble in water. Consequently, when adipic acid is used the majority of the crosslinker may be present in the form of dispersed particles. This may reduce the surface area and therefore the number of reactive carboxylic acid groups available to participate in the crosslinking reaction between carboxylic acid and hydroxyl groups from polyvinyl alcohol.

When there is insufficient crosslinker present in the composition there may be an insufficient degree of crosslinking with the result that there may be little or no enhancement of film properties. An amount of about 1% adipic acid may be an optimum amount as there is no blanching and the Cobb values after a 10-minute Cobb test are reduced quite significantly. Having more than about 1% adipic acid is less effective, as although blanching is prevented the Cobb value may not be further reduced.

The compositions of the present invention provide several advantages over previously known biopolymer dispersions, particularly those that consist only of a biopolymer, polyvinyl alcohol as stabilising agent and a rheology modifier. The water resistance of a film coated onto a cellulosic substrate as measured by the Cobb value may be increased. The appearance of the film may be maintained after exposure of water. Unexpectedly, the films have been found not to blanch, that is not to develop a whitened appearance. Furthermore, exemplary compositions in accordance with this invention exhibit an advantageous combination of low water absorption and resistance to blanching.

The compositions may further comprise a wax or tackifier.

Exemplary waxes and tackifiers are carnauba wax, beeswax, polyethylene, copolymers of polyethylene, oxidized polyethylene, copolymers of oxidized polyethylene, polyethers, lanolin, shellac, paraffin, candelilla, microcrystalline waxes, soy wax, montan wax, rosin ester, terpene resin, terpene-phenol resin, terpene phenol, pentaerythritol rosin ester, a modified terpene resin, a polyterpene, a phenol modified copolymer of styrene, and alpha methyl styrene, hydrocarbon resins and mixtures thereof.

Exemplary preferred waxes are selected from the group consisting of: carnauba wax, beeswax, polyethylene, copolymers of polyethylene, oxidized polyethylene, copolymers of oxidized polyethylene, polyethers, lanolin, shellac, paraffin, candelilla, microcrystalline waxes, soy wax, montan wax and mixtures thereof.

An amount of wax of about 1 wt % to about 12 wt %, preferably about 2 wt % to about 10 wt %, more preferably about 4.0 wt % to about 8.0 wt % may be employed.

Use of a wax in the composition may provide several advantages. Water repellence may be improved so that water forms beads on the surface of the film. The wax may increase the hydrophobicity of the coating, increasing water repellent properties and reducing the absorption of water by the coating. A reduced Cobb value may be obtained. Use of a wax may reduce the amount of biopolymer required. A more glossy appearance to the film may be achieved.

The water absorption capacity of a cellulosic material may be measured as a Cobb Value. The Cobb value is the mass of water (g/m$^2$) absorbed in a specific time, usually 60 or 120 seconds, by a laminar cellulosic material such as paper or paperboard under depth of 1 cm of water. The test is carried out in a device which permits only one side of the sheet to be exposed to water.

The compositions of the present invention and composites, including coatings comprising the compositions provide many advantages in comparison to previously known products.

According to a second aspect of the present invention, a method of manufacture of a biopolymer coated cellulosic article comprises the steps of:

applying an aqueous biopolymer composition in accordance with the first aspect of the present invention to a surface of a cellulosic substrate to form a coated substrate;

allowing water to vaporise from the substrate to form a dry coated substrate; and heating the dry coated substrate to cure the composition to form a biopolymer film coated article.

The substrate may comprise a cellulosic material such as a cellulosic paper, paperboard, construction paper, kraft paper, art paper and coated paper or biopolymer film. The compostable coating has a coat weight from about 1 to about 20 grams per square meter (g/m$^2$), preferably about 5 to 15 g/m$^2$ on a dry weight basis.

According to a third aspect of the present invention, a coated article comprises a cellulosic or biopolymer substrate coated with a film formed from a coating composition in accordance with the first aspect of the present invention. The article may be formed by the method of the second aspect of the present invention.

The article may comprise a laminar or sheet material which may be used for manufacture of packaging, containers, for example for food products.

In the present specification, percentages and other amounts are by weight, unless otherwise stated, and are selected from any ranges quoted to a total of 100%.

The invention is further described by means of example but not in any limitative sense.

EXAMPLE 1

Batches of the polybutylene adipate terephthalate (PBAT) dispersion were manufactured using a high-pressure reactor. These were all stabilised using polyvinyl alcohol (PVOH). In each example the PBAT and PVOH were heated to 140° C. and stirred for an hour at this temperature. Water was then slowly added to the vessel over a period of 30 to 45 minutes before the batch was cooled and the pressure was released. The crosslinking agents were post-added to the cooled dispersions (<40° C.) and stirred until homogenous. The formulations were as shown in Table 1 below:

TABLE 1

Index of formulations, PBAT and crosslinker

| Raw Material | Example 1 % of formulation | Example 2 % of formulation | Example 3 % of formulation | Example 4 % of formulation |
|---|---|---|---|---|
| PBAT | 40 | 40 | 40 | 40 |
| PVOH | 2.67 | 2.67 | 2.67 | 2.67 |
| adipic acid | 0 | 1 | 0 | 0 |
| glyoxal | 0 | 0 | 0.08 | 0 |
| citric acid | 0 | 0 | 0 | 0.5 |
| water | 57.33 | 56.33 | 57.25 | 56.83 |

Carnauba wax was added to the dispersions to further improve the water resistance of the dried films. The formulations were as shown in Table 2 below.

TABLE 2

Index of formulations, PBAT, wax and crosslinker

| Raw Material | Example 5 % of formulation | Example 6 % of formulation | Example 7 % of formulation | Example 8 % of formulation |
|---|---|---|---|---|
| PBAT | 36 | 36 | 36 | 36 |
| carnauba wax | 4 | 4 | 4 | 4 |
| PVOH | 2.67 | 2.67 | 2.67 | 2.67 |
| adipic acid | 0 | 1 | 0 | 0 |
| glyoxal | 0 | 0 | 0.08 | 0 |
| citric acid | 0 | 0 | 0 | 0.5 |
| water | 57.33 | 56.33 | 57.25 | 56.83 |

The dispersions were coated on kraft paper at a dry coat weight of 10 g/m² and dried in an oven at 130° C. for 1 minute. A Cobb test was conducted on each film for 2, 5 and 10 minutes and the blanching of the coating was observed at 2 and 10 minutes. The results are set out in Table 3 below:

TABLE 3

PBAT results

| Example No. | Crosslinked | Crosslinker | Cobb value (g/m²) 2 mins | 5 mins | 10 mins | Blanching 2 mins | 10 mins |
|---|---|---|---|---|---|---|---|
| 1 | N | — | 3.41 | 9.26 | 16.47 | N | Y |
| 2 | Y | adipic acid | 2.35 | 5.42 | 9.35 | N | N |
| 3 | Y | glyoxal | 2.63 | 7.01 | 9.89 | N | N |
| 4 | Y | citric acid | 3.62 | 9.81 | 16.5 | N | Y |
| 5 | N | — | 2.2 | 4.84 | 14.42 | N | Y |
| 6 | Y | adipic acid | 2.00 | 4.60 | 8.13 | N | N |
| 7 | Y | glyoxal | 1.95 | 5.20 | 8.03 | N | N |
| 8 | Y | citric acid | 2.49 | 6.63 | 12.62 | N | Y |

Y = Yes
N = No

The results showed that crosslinking did not have a significant effect after a 2-minute Cobb test had been conducted. Some improvement was seen in the Cobb value when the crosslinker was adipic acid or glyoxal after a 2-minute Cobb test. This was observed in both wax and non-wax containing formulations. There was not a significant difference in the Cobb values between un-crosslinked and citric acid crosslinked PVOH dispersions. Crosslinking with citric acid may occur more slowly in the stated drying conditions than for adipic acid and glyoxal, so that the coating may require stoving for a longer period of time for an improvement to be seen. None of the films blanched after the 2-minute Cobb test. This may be due to the short exposure time of the film to water.

After conducting longer Cobb tests for 5 and 10 minutes also on kraft paper at 10 g/m², the effects of crosslinking were more noticeable. A suitable crosslinker reduced the uptake of water and hence had a lower Cobb value than an un-crosslinked sample. The appearance of the film was unaffected by water and did not blanch. The un-crosslinked film blanched after longer Cobb tests but the degree of blanching appeared to be dependent on particle size. Un-crosslinked films may also have significantly larger Cobb values indicating that the film absorbs more water than films which have been crosslinked with adipic acid or glyoxal. The Cobb results with formulations crosslinked with citric acid were comparable to those which had not been crosslinked, further indicating that citric acid is not a sufficient crosslinker and is not effective under the drying conditions.

It should be noted however that although the Cobb values are similar the blanching was not as severe.

Incorporating wax into the formulation increased the hydrophobicity of the film. This may be due to the increased water repellence. Less water may be absorbed by the film leading to a reduction in the observed Cobb value. The reduced surface tension of the film due to the addition of wax caused the water to bead on the surface. Water appeared to spread across films that do not contain wax, giving a smaller contact angle and a larger amount of water is absorbed by the film.

EXAMPLE 2

Example 1 was repeated using a range of alternative polyacids to crosslink the PVOH. These included boric acid and maleic acid. The coatings were found to blanch after a 2-minute Cobb test. These polyacids were deemed to be unsuitable. Longer Cobb tests were not conducted.

Experiment 1 was repeated using borax and ammonium zirconium carbonate (AZC) to crosslink the PVOH. The AZC crosslinked PBAT dispersion also blanched after a 2-minute Cobb test and was deemed unsuitable. Borax destabilised the dispersion and therefore films were unable to be prepared for testing.

Improved Cobb values were seen in PBAT dispersion films that are crosslinked with adipic acid and glyoxal. This became more apparent with longer Cobb tests. This showed that the improvement in water resistance of the films was due to crosslinking. The crosslinking of PVOH with adipic acid and glyoxal unexpectedly appeared to make the film resistant to blanching. This was more evident after longer exposure to water. Although the degree of blanching and the Cobb value were reduced when crosslinking the PVOH in non-wax formulations, further wax was required to improve the water resistance. Incorporating a wax into the formulation was found to increase hydrophobicity of the film and reduce the amount of water which is absorbed and therefore reducing the Cobb value.

EXAMPLE 3—EFFECT OF GLYOXAL IN DIFFERENT BIOPOLYMERS DISPERSIONS

Experiments were carried out to investigate the effect of adipic acid and glyoxal in crosslinking various PVOH stabilised biopolymer dispersions.

EXPERIMENTAL

Batches of the polybutylene succinate (PBS) and polybutylene succinate adipate (PBSA) dispersion were manufactured using a high-pressure reactor. The batches were stabilised using polyvinyl alcohol (PVOH). In each example the biopolymer and PVOH were heated to −130° C. and stirred for an hour at this temperature. Water was then slowly added to the vessel over a period of 30 to 45 minutes before the batch was cooled and the pressure was released. The crosslinkers were post-added to the cooled dispersions (<40° C.) and the resultant mixtures were stirred until homogenous. The formulations were as set out in Table 4 below:

TABLE 4

Index of formulations, PBS, wax and crosslinker

| Raw Material | Example 9 % of formulation | Example 10 % of formulation | Example 11 % of formulation | Example 12 % of formulation |
|---|---|---|---|---|
| PBS | 40 | 40 | 36 | 36 |
| PVOH | 2.67 | 2.67 | 2.67 | 2.67 |

TABLE 4-continued

Index of formulations, PBS, wax and crosslinker

| Raw Material | Example 9 % of formulation | Example 10 % of formulation | Example 11 % of formulation | Example 12 % of formulation |
|---|---|---|---|---|
| wax | 0 | 0 | 4 | 4 |
| glyoxal | 0 | 0.25 | 0 | 0.25 |
| water | 57.33 | 57.08 | 57.33 | 57.08 |

TABLE 5

Index of formulations, PBSA, wax and crosslinker

| Raw Material | Example 13 % of formulation | Example 14 % of formulation | Example 15 % of formulation | Example 16 % of formulation |
|---|---|---|---|---|
| PBSA | 40 | 40 | 36 | 36 |
| PVOH | 2.67 | 2.67 | 2.67 | 2.67 |
| wax | 0 | 0 | 4 | 4 |
| glyoxal | 0 | 0.12 | 0 | 0.12 |
| water | 57.33 | 57.21 | 57.33 | 57.21 |

The dispersions were then coated on kraft paper at a dry coat weight of 10 g/m² and dried in an oven at 130° C. for 1 minute. A Cobb test was conducted on each film for 2, 5 and 10 minutes and the blanching observed at 2 and 5 minutes. The results are set out in Table

TABLE 6

Results PBS, PBSA

| Example No. | Crosslinked | Wax | Cobb value (g/m²) 2 mins | 5 mins | 10 mins | Blanching 2 mins | 10 mins |
|---|---|---|---|---|---|---|---|
| 9  | N | N | 3.11 | 6.20  | 7.33  | N | Y |
| 10 | Y | N | 2.46 | 4.71  | 8.47  | N | N |
| 11 | N | Y | 2.09 | 5.34  | 7.01  | N | Y |
| 12 | Y | Y | 2.14 | 4.08  | 6.51  | N | N |
| 13 | N | N | 2.82 | 14.08 | 15.60 | Y | Y |
| 14 | Y | N | 2.95 | 10.56 | 14.19 | N | N |
| 15 | N | Y | 3.43 | 12.85 | 14.82 | Y | Y |
| 16 | Y | Y | 2.95 | 9.29  | 12.98 | N | N |

Y = Yes
N = No

No significant differences between the Cobb values of crosslinked and un-crosslinked films after a 2-minute Cobb test were observed. No blanching was observed. This may be due to the short exposure time of the film to the water. The effect of crosslinking with glyoxal was more apparent after longer Cobb tests. Crosslinking PVOH in PBS dispersions with glyoxal improved the Cobb value after longer Cobb tests had been conducted. There was no sign of blanching of films which had been crosslinked. This result was consistent on films both with and without wax.

PBSA naturally has poorer water resistance than PBS and PBAT and this may have resulted in the larger Cobb values observed as more water is absorbed by the film. This was more noticeable after longer Cobb tests have been conducted. Crosslinking the PVOH with glyoxal in PBSA dispersions prevented blanching and improved the water resistance of the film and so improved the Cobb value. As seen previously, incorporating a wax into the formulation reduces the surface tension of the film creating a more hydrophobic coating causing water to bead on the film. Films of PBSA dispersions not containing wax have a higher surface tension in comparison and the water therefore spreads across the film after a Cobb test.

Crosslinking the PVOH in PBS and PBSA dispersions with glyoxal improved the Cobb results and prevents blanching. The benefits of crosslinking were more noticeable after longer Cobb tests had been conducted. Blanching was also prevented, and the films remained intact.

EXAMPLE 4—OPTIMISING THE LEVEL OF CROSSLINKER

An experiment was carried out to determine an optimal amount of adipic acid crosslinker in PVOH stabilised polybutylene adipate terephthalate (PBAT) dispersions. Batches of the polybutylene adipate terephthalate (PBAT) dispersion were manufactured using a high-pressure reactor. These were stabilised using polyvinyl alcohol (PVOH). In each example the PBAT and PVOH were heated to 140° C. and stirred for an hour at this temperature. Water was then slowly added to the vessel over a period of 30 to 45 minutes before the batch was cooled and the pressure was released. The crosslinking agents were post-added at varying levels to the cooled dispersions (<40° C.) and stirred until homogenous. The formulations are as set out in Table 7 below:

TABLE 7

Index of formulations, PRAT, wax and varying crosslinker level

| Raw Material | Example 17 % of formulation | Example 18 % of formulation | Example 19 % of formulation | Example 20 % of formulation | Example 21 % of formulation | Example 22 % of formulation |
|---|---|---|---|---|---|---|
| PBAT | 36 | 36 | 36 | 36 | 36 | 36 |
| PVOH | 2.67 | 2.67 | 2.67 | 2.67 | 2.67 | 2.67 |
| carnauba wax | 4 | 4 | 4 | 4 | 4 | 4 |
| adipic acid | 0 | 0.1 | 0.5 | 0.75 | 1 | 1.5 |
| water | 57.33 | 57.23 | 56.83 | 56.58 | 56.33 | 55.83 |

The dispersions were then coated on kraft paper at a dry coat weight of 10 g/m² and dried in an oven at 130° C. for 1 minute. A Cobb test was conducted on each film for 2, 5 and 10 minutes and the degree of blanching was observed after 2 and 5 minutes. The results are shown in Table 8 below.

TABLE 8

Results using PBAT at varying crosslinker levels

| Example No. | Crosslinked | Wax | Cobb value (g/m²) 2 mins | 5 mins | 10 mins | Blanching 2 mins | 5 mins |
|---|---|---|---|---|---|---|---|
| 17 | Y | Y | 3.41 | 9.26 | 16.47 | N | y |
| 18 | Y | Y | 3.4  | 6.06 | 14.82 | Y | Y |
| 19 | Y | Y | 2.95 | 7.90 | 12.98 | Y | Y |
| 20 | Y | Y | 2.36 | 7.05 | 10.59 | N | N |
| 21 | Y | Y | 2.00 | 4.60 | 8.13  | N | N |
| 22 | Y | Y | 2.39 | 6.80 | 11.78 | N | N |

Having too much or too little crosslinker may also affect the film properties. For example, too little crosslinker may reduce the amount of blanching which occurs but may not totally prevent it from occurring. For example, crosslinking the PBAT dispersion with 0.1% adipic acid results in a similar Cobb value to un-crosslinked PBAT after a 2-minute Cobb test. However, there appeared to be a reduction in Cobb value after longer Cobb tests had taken place. It was noted however that the films had blanched. This amount of cross-linker had appeared to improve the Cobb value however as the film had been affected. It is possible some of the film had been removed producing a lower Cobb value. An amount of 0.1% adipic acid may be unsuitable to maintain film properties after contact with water. Increasing the amount of adipic acid to 0.5% prevented blanching from occurring after two- and five-minute Cobb tests but was seen after a 10-minute Cobb test.

Increasing the amount of adipic acid to 1% reduced the Cobb value by the greatest amount and therefore appeared to be an optimum amount of this crosslinker.

Using 1.5% adipic acid to crosslink the PVOH may not be suitable because as shown in the Table, although blanching was prevented the Cobb value was not further reduced. It is possible that there was free unreacted adipic acid in the film as insufficient PVOH was available to be crosslinked. Therefore, an excess of adipic acid may have been present.

EXAMPLE 5—CROSSLINKING AN AQUEOUS PBAT DISPERSION

A PBAT dispersion which is stabilised with PVOH was manufactured in a high pressure reactor. The raw materials and initial water were placed in the vessel which was then sealed and heated to 140° C. At this temperature pressure built up in the vessel and reached approx. 2.6 bar. When the mix has reached the process temperature (140° C.) it was stirred for 1 hour at 300 rpm. Water was added in parts at different flow rates to create the particle size. Hot water 1 was added over 18 mins. Hot water 2 was added over 10 mins. The stirrer speed was then reduced, and the mixture was allowed to cool in a water bath. When the temperature was below 40° C. the dispersion was taken out of the vessel and filtered through a 150 μm sock. The dispersion was thickened using a 2% xanthan gum solution. The formulation is shown in Table 9 below:

TABLE 9

| Raw Material | % |
| --- | --- |
| PBAT | 36 |
| PVOH | 2.67 |
| antioxidant | 0.5 |
| adipic acid | 1 |
| carnauba wax | 4 |
| initial water | 7.5 |
| hot water 1 | 12 |
| hot water 2 | 36.093 |
| xanthan gum | 0.087 |
| acticide FTW2 | 0.1 |
| acticide mv | 0.05 |

Once the dispersion has been thickened and the solids were within specification the dispersion was then re-filtered through a 50 μm sock and was quality control (QC) tested. The parameters for the QC testing are shown in Table 10 below:

TABLE 10

| Parameter | Specification | Actual |
| --- | --- | --- |
| total solids (%) | 42-44 | 43.5 |
| viscosity (cP) | 200-600 | 410 |
| pH | 3-5 | 3.24 |

TABLE 10-continued

| Parameter | Specification | Actual |
| --- | --- | --- |
| particle size (μm) | d50 | 1.366 |
| | d95 | 4.102 |
| specific gravity (g/cm$^3$) | 1.0-1.1 | 1.065 |

The dispersion was coated on kraft paper at 10 g/m$^2$ and dried in an oven for 1 min at 130° C. A smooth, glossy film was formed. The films were Cobb tested for 2, 5 and 10 minutes and then inspected for any film defects and/or blanching. As expected, the Cobb value increased as the length of time exposed to water was increased. As this PBAT dispersion contained wax the water beads on the surface after the Cobb test attributed to the hydrophobic effects of the film. The film remained intact and there was no sign of blanching even after a 10-minute Cobb test had taken place.

The film also heat sealed at 120° C. A-A and A-B at 2 bar pressure for a seal time of 1 second. When sealed at these parameters, and subsequently pulled apart using a tensiometer, substrate failure was observed. A seal was not formed at lower seal temperatures at the same pressure. Using the Tappi T559 grease resistance test the film had a kit test rating of 5. This demonstrated that the film had relatively good grease resistance.

EXAMPLE 6—CROSSLINKING AN AQUEOUS PBS DISPERSION

A PBS dispersion which was stabilised with PVOH was manufactured in the high pressure reactor. All of the raw materials and initial water were placed in the vessel which was then sealed and heated to 130° C. At this temperature pressure built up in the vessel and was approximately 1.8 bar. When the mix had reached the process temperature (130° C.) it was stirred for 1 hour at 300 RPM. Water was added in parts at different flow rates to create the desired particle size. Hot water batch 1 was added over 15 mins and hot water batch 2 was added over 10 mins. The stirrer speed was then reduced, and the mixture was allowed to cool in a water bath. When below 40° C. the dispersion was taken out of the vessel and filtered through a 150 μm sock. The formulation is shown in Table 11 below:

TABLE 11

| Raw Material | % |
| --- | --- |
| PBS | 36 |
| PVOH | 2.67 |
| antioxidant | 0.5 |
| maleic acid | 1 |
| carnauba wax | 4 |
| initial water | 9.0 |
| hot water 1 | 10 |
| hot water 2 | 36.83 |
| acticide FTW2 | 0.1 |
| acticide mv | 0.05 |

The PBS dispersion did not require thickening with xanthan gum as it was viscous. Once solids are within specification the dispersion was filtered through a 50 μm sock and QC tested. The QC test parameters are shown in Table 12 below:

TABLE 12

| Parameter | Specification | Actual |
|---|---|---|
| total solids (%) | 42-44 | 43.35 |
| viscosity (cP) | 200-600 | 580 |
| pH | 5-7 | 5.20 |
| particle size (μm) | d50 | 1.882 |
|  | d95 | 6.837 |
| specific gravity (g/cm$^3$) | 1.0-1.1 | 1.097 |

The dispersion was coated on kraft paper at 10 g/m$^2$ and was dried in an oven for 1 min at 130° C. A smooth, glossy film was formed. The films were Cobb tested for 2, 5 and 10 minutes and then inspected for any film defects and/or blanching. As this film also contained wax the water formed beads on the film surface after the Cobb test. As expected, the Cobb value increased as the length of time exposed to water was increased. The film remained intact and there was no sign of blanching after each Cobb test has taken place.

The PBS film was heat sealed at 120° C. A-A and A-B at 2 bar pressure for a seal time of 1 second. When sealed at these parameters and subsequently pulled apart using a tensiometer substrate failure was observed. A seal was not formed at lower seal temperatures at the same pressure. Using the Tappi T559 grease resistance test the film has a kit test rating of 12 indicating that the PBS film has extremely good grease resistance properties. The results are further demonstrated in the table on page 19.

EXAMPLE 7—CROSSLINKING AN AQUEOUS PBSA DISPERSION

A PBSA dispersion which was stabilised with PVOH was manufactured in a high pressure reactor. All of the raw materials and initial water were placed in the vessel which was then sealed and heated to 115° C. At this temperature pressure built up in the vessel and was approx. 0.6 bar. When the mixture had reached the process temperature (115° C.) it was stirred for 1 hour at 300 RPM. Water was added in parts at different flow rates to create the particle size. Hot water batch 1 was added over 15 mins and hot water batch 2 is added over 10 mins.

The stirrer speed was then reduced, and the mixture was allowed to cool in a water bath. When below 40° C. the dispersion is taken out of the vessel and filtered through a 150 μm sock. The dispersion s thickened using a 2% solution of xanthan gum. The formulation is shown in Table 13 below:

TABLE 13

| Raw Material | % |
|---|---|
| PBSA | 36 |
| PVOH | 2.67 |
| antioxidant | 0.5 |
| adipic acid | 1 |
| carnauba wax | 4 |
| initial water | 7.5 |
| hot water 1 | 10 |
| hot water 2 | 38.24 |
| xanthan gum | 0.087 |
| acticide FTW2 | 0.1 |
| acticide mv | 0.05 |

Once the dispersion has been thickened and the solids are within specification the dispersion was re-filtered through a 50 μm sock and was QC tested. The parameters for the QC testing are shown in Table 14 below:

TABLE 14

| Parameter | Specification | Actual |
|---|---|---|
| total solids (%) | 42-44 | 42.95 |
| viscosity (cP) | 200-600 | 390 |
| pH | 5-7 | 4.95 |
| particle size (μm) | d50 | 1.604 |
|  | d95 | 5.190 |
| specific gravity (g/cm$^3$) | 1.0-1.1 | 1.071 |

The dispersion was coated on kraft paper at 10 g/m$^2$ and dried in an oven for 1 min at 110° C. A smooth, glossy film was formed. The films were Cobb tested for 2, 5 and 10 minutes and then inspected for any film defects and/or blanching. As this film also contained wax the water formed beads on the film surface after the Cobb test. As expected, the Cobb value increased as the length of time exposed to water is increased. The film remained intact and there was no sign of blanching after each Cobb test has taken place. The results are shown in Table 15 below:

TABLE 15

| | Cobb value (g/m$^2$) | | | | MVTR | Heat seal temp (° C.) | | Grease resist- |
|---|---|---|---|---|---|---|---|---|
| Ex. No. | 2 min | 5 min | 10 min | Blan- ching | (g/m$^2$ · day) | A-A | A-B | mode of failure | ance kit test |
| 5 | 2.00 | 4.60 | 8.13 | N | 119.20 | 120 | 120 | substrate | 5 |
| 6 | 2.14 | 4.71 | 6.51 | N | 221.31 | 120 | 120 | substrate | 12 |
| 7 | 2.95 | 9.29 | 12.98 | N | 272.88 | 105 | 105 | substrate | 4 |

The PBSA film heat sealed at 105° C. A-A and A-B. The mode of failure was substrate failure as the substrate tears when pulled apart on the tensiometer. Temperatures sealed below this do not form a seal at this pressure. Additionally, using the Tappi T559 grease resistance test the film had a kit test rating of 4. PBSA was the least effective film for grease resistance out of all the biopolymers tested.

EXAMPLE 8—CROSSLINKING POLYCAPROLACTONE AND POLYBUTYLENE SUCCINATE BLENDS

The PCL and PBS blends were manufactured using a high-pressure reactor (HPR). These were all stabilised using PVOH. The PCL, PBS and PVOH were all heated to 130° C. and stirred for one hour maintaining this temperature. Water was then slowly added to the vessel over a period of 30 to 45 minutes before the batch was cooled and the pressure was released. The dispersion was tested with and without crosslinker. The crosslinker was post-added to the dispersion and stirred until homogenous. The formulations are set out in Table 16 below:

TABLE 16

Index of PCL/PBS formulations with and without crosslinker

| Raw Material | Example 1 % of formulation | Example 2 % of formulation |
|---|---|---|
| PBS (FZ71PM) | 18 | 18 |
| PCL (CAPA 6250) | 18 | 18 |
| Antioxidant | 0.5 | 0.5 |

TABLE 16-continued

Index of PCL/PBS formulations with and without crosslinker

| Raw Material | Example 1 % of formulation | Example 2 % of formulation |
|---|---|---|
| Wax | 4 | 4 |
| Maleic anhydride (Crosslinker) | 0 | 1 |
| PVOH | 2.67 | 2.67 |
| Water | 56.83 | 55.83 |

TABLE 17

Summary of PBS/PCL film properties

| | | Film properties | | | | |
|---|---|---|---|---|---|---|
| | | Cobb value (g/m$^2$) | | | | MVTR |
| Example | MFFT (° C.) | 2 mins | 5 mins | 10 mins | Heat seal temp (° C.) | Kit value | value (g/m$^2$·day) |
| 6 | 99-104 | 1.80 | 4.17 | 8.62 | 120 | 12 | 120.50 |
| 7 | 99-104 | 1.37 | 3.73 | 6.76 | 120 | 12 | 63.53 |

All films were single coated at 10 g/m$^2$ on Sappi paper and film formed in an oven at 130° C. for 1 minute. MVTR was tested on double coated films.

Crosslinking the PVOH in the PBS/PCL blend improved the water resistance of the film. This was shown in the reduced Cobb values seen at two, five and ten minutes. There were also no signs of blanching on the crosslinked film. Blanching had been seen on un-crosslinked films particularly when longer Cobb tests had been conducted. In addition to the reduction of the Cobb values, the use of crosslinker in the PBS/PCL film almost halved the MVTR value from 120.5 to 63.53 g/m$^2$·day. Other film properties such as grease resistance are not affected as the kit value of the blend is already at a maximum value of 12 and therefore could not be improved further.

EXAMPLE 9—CROSSLINKING POLYCAPROLACTONE AND POLYBUTYLENE SUCCINATE BLENDS

A PBS and PCL blend dispersion which is stabilised with PVOH was manufactured in the HPR. All of the raw materials and initial water were placed in the vessel which was then sealed and heated to 130° C. At this temperature pressure built up in the vessel and was approx. 0.6 bar. When the mix reached the process temperature (130° C.) it was stirred for 1 hour at 300 RPM. Water was added in parts at different flow rates to create the particle size. Hot water 1 was added over 15 mins and hot water 2 was added over 10 mins. The stirrer speed was then reduced, and the mixture was allowed to cool in a water bath. When below 40° C. the dispersion was taken out of the vessel and filtered through a 150 μm filter. The dispersion was thickened using a 2% solution of xanthan gum. The formulation is shown in Table 18 below:

TABLE 18

Index of PCL/PBS formulations with and without crosslinker

| Raw Material | Example 1 % of formulation | Example 2 % of formulation |
|---|---|---|
| PBS | 18 | 18 |
| PCL | 18 | 18 |
| PVOH | 2.67 | 2.67 |
| Antioxidant | 0.5 | 0.5 |
| Adipic acid | 1 | 0 |
| Wax | 4 | 4 |
| Initial water | 9 | 9 |
| Hot water 1 | 10 | 10 |
| Hot water 2 | 25 | 25 |
| Hot water 3 | 13.24 | 12.59 |
| Xanthan gum | 0.087 | 0.087 |
| Acticide FTW2 | 0.1 | 0.1 |
| Acticide mv | 0.05 | 0.05 |

Once the dispersion had been thickened and the solids were within specification the dispersion was then re-filtered through a 50 μm sock and was QC tested. The parameters for the QC testing are shown in Table 19 below:

TABLE 19

| Parameter | Specification |
|---|---|
| Total solids (%) | 42-44 |
| Viscosity (cP) | 200-600 |
| pH | 5-7 |
| particle size (μm) | d50 |
| | d95 |
| specific gravity (g/cm$^3$) | 1.0-1.1 |

TABLE 20

Summary of PBS/PCL film properties

| | | Film properties | | | | |
|---|---|---|---|---|---|---|
| | | Cobb value (g/m$^2$) | | | | |
| Example | MFFT (° C.) | 2 mins | 5 mins | 10 mins | Heat seal temp (° C.) | Kit value | MVTR value (g/m$^2$·day) |
| 1 | 99-104 | 1.80 | 4.17 | 8.62 | 120 | 12 | 120.50 |
| 2 | 99-104 | 1.37 | 3.73 | 6.76 | 120 | 12 | 63.53 |

Table 20: All films were single coated at 10 gsm on Sappi paper and film formed in an oven at 130° C. for 1 minute. MVTR was tested on double coated films.

Crosslinking the PVOH in the PBS/PCL blend improved the water resistance of the film. This was shown in the reduced Cobb values seen at two, five and ten minutes. There were also no signs of blanching on the crosslinked film. Blanching had been seen on un-crosslinked films particularly when longer Cobb tests had been conducted. In addition to the reduction of the Cobb values, the use of crosslinker in the PBS/PCL film almost halved the MVTR value from 120.5 to 63.53 g/m$^2$·day. Other film properties such as grease resistance were not affected as the kit value of the blend was already at a maximum value of 12 and therefore could not be improved further.

EXAMPLE 10—CROSSLINKING A POLYBUTYLENE SUCCINATE ADIPATE AND POLYBUTYLENE SUCCINATE BIOPOLYMER BLENDS

A PBSA and PBS blend dispersion which is stabilised with PVOH was manufactured in the HPR. All of the raw materials and initial water were placed in the vessel which was then sealed and heated to 130° C. At this temperature pressure built up in the vessel and was approx. 0.6 bar. When the mixture had reached the process temperature (130° C.) it was stirred for 1 hour at 300 RPM. Water was added in parts at different flow rates to create the particle size. Hot water 1 was added over 15 mins and hot water 2 was added over 10 mins. The stirrer speed was then reduced, and the mixture was allowed to cool in a water bath. When below 40° C. the dispersion was taken out of the vessel and filtered through a 150 μm filter. The dispersion was thickened using a 2% solution of xanthan gum. The formulation is shown in Table 21 below:

TABLE 21

Index of PBSA/PBS formulations with and without crosslinker

| Raw Material | Example 3 % of formulation | Example 4 % of formulation |
| --- | --- | --- |
| PBSA | 27 | 27 |
| PBS | 9 | 9 |
| PVOH | 2.67 | 2.67 |
| Antioxidant | 0.5 | 0.5 |
| Adipic acid | 1 | 0 |
| Wax | 4 | 4 |
| Initial water | 9 | 9 |
| Hot water 1 | 10 | 10 |
| Hot water 2 | 25 | 25 |
| Hot water 3 | 13.24 | 12.59 |
| Xanthan gum | 0.087 | 0.087 |
| Acticide FTW2 | 0.1 | 0.1 |
| Acticide mv | 0.05 | 0.05 |

Once the dispersion had been thickened and the solids were within specification the dispersion was then re-filtered through a 50 μm sock and was QC tested. The parameters for the QC testing are shown in Table 22 below:

TABLE 22

| Parameter | Specification |
| --- | --- |
| Total solids (%) | 42-44 |
| Viscosity (cP) | 200-600 |
| pH | 5-7 |
| particle size (μm) | d50 |
|  | d95 |
| specific gravity (g/cm$^3$) | 1.0-1.1 |

The dispersion was single coated on kraft paper at 10 g/m$^2$ and dried in an oven for 1 min at 130° C. A smooth, glossy film was formed. Cobb tests were performed on the film to determine the water barrier properties of the film. The film was also inspected for any film defects and/or blanching after water exposure. As with the other examples, this formulation also contained wax therefore it was expected that water formed beads upon the surface. The barrier properties of the film are shown in Table 23 below:

TABLE 23

| | Film properties | | | | | |
| --- | --- | --- | --- | --- | --- | --- |
| | | Cobb value (g/m$^2$) | | | | |
| Example | MFFT (° C.) | 2 mins | 5 mins | 10 mins | Heat seal temp (° C.) | Kit value | MVTR value (g/m$^2$ · day) |
| 3 | 80-85 | 1.70 | 4.42 | 8.62 | 120 | 12 | 220 |
| 4 | 80-85 | 2.21 | 6.51 | 10.19 | 120 | 12 | 248 |

Test Methods

Cobb Value—The Cobb value is defined as the amount of water absorbed in a specific time by 1 square meter of paper under 1 cm of water measured in g/m$^2$. The test is in accordance with Tappi T 441. The specimen is weighed to the nearest 0.01 g and placed into the specimen holder. 100 cm$^3$ of demineralised water is poured into the specimen holder and the timer is started. Approximately ten seconds before the end of the test the water is poured out and the substrate is dried by placing blotting paper on top of the specimen and rolling with a hand roller. The specimen is then reweighed, and the Cobb value calculated. The specified times used in this investigation are 2, 5 and 10 minutes.

Blanching—This defines a whitened area of the film after exposure to water. An internal test which is determined by eye.

Grease resistance kit test—The test is in accordance with Tappi T559. The kit number is assigned when the coating has been visually affected by the mixture.

The invention claimed is:

1. An aqueous biopolymer dispersion composition comprising:
   a biopolymer selected from the group consisting of: polybutylene adipate terephthalate (PBAT), polybutylene succinate (PBS), polybutylene succinate adipate (PBSA), polylactic acid (PLA), poly (3-hydroxybutyrate) (PHB), polycaprolactone (PCL), poly (3-hydroxybutyrate-co-3-hydroxyhexanoate) (PHBH); poly (3-hydroxybutyrate-co-3-hydroxyvalerate) (PHBV), polyhydroxyalkanoate (PHA), and mixtures thereof;
   a stabilising agent selected from the group consisting of: polyvinyl alcohol, fatty alcohol ethoxylates, ethylene oxide/propylene oxide (EO/PO) block copolymers, salts of fatty acids and mixtures thereof;
   a rheology modifier;
   a cross-linking agent being a bifunctional carboxylic acid or bifunctional aldehyde;
   optional further ingredients; and
   water.

2. The composition according to claim 1, wherein the biopolymer is present in the dispersion in the amount of 10 wt % to 80 wt % based on the total weight of the aqueous dispersion.

3. The composition according to claim 1, further comprising a wax or tackifier selected from the group consisting of: carnauba wax, beeswax, polyethylene, copolymers of polyethylene, oxidized polyethylene, copolymers of oxidized polyethylene, polyethers, lanolin, shellac, paraffin, candelilla, microcrystalline waxes, soy wax, montan wax, rosin ester, terpene resin, terpene-phenol resin, terpene phenol, pentaerythritol rosin ester, a modified terpene resin, a polyterpene, a phenol modified copolymer of styrene, and alpha methyl styrene, hydrocarbon resins and mixtures thereof.

4. The composition according to claim 3, wherein the amount of wax is from 1 wt % to 12 wt %.

5. The composition of claim 3, wherein the amount of wax is from 4wt % to 8wt %.

6. The composition according to claim 1, wherein the stabilising agent is polyvinyl alcohol.

7. The composition according to claim 1, wherein the stabilising agent is present in the dispersion in an amount of 1 wt % to 6 wt.

8. The composition according to claim 1, wherein the rheology modifier is selected from the group consisting of: xanthan gum, cellulose ether, carboxy methyl cellulose, guar, polysaccharides, fully hydrolysed polyacrylic acid, polyurethane thickeners, and mixtures thereof.

9. The composition as claimed in claim 1, wherein the cross-linking agent is selected from the group consisting of: oxalic acid, malonic acid, succinic acid, glutaric acid, pimelic acid, suberic acid, azelaic acid, sebacic acid, undecanedioic acid, dodecanedioic acid, brassylic acid, thapsic acid, japanic acid, phellogenic acid, equisetolic acid, maleic acid, fumaric acid, acetylene dicarboxylic acid, glutaconic acid, traumatic acid, muconic acid, glutinic acid, citraconic acid, mesaconic acid, itaconic acid, tartronic acid, mesoxalic acid, malic acid, tartaric acid, oxaloacetic acid, aspartic acid, α-hydroxyglutaric acid, arabinaric acid, acetone dicarboxylic acid, α-ketoglutaric acid, glutamic acid, diaminopimelic acid, saccharic acid, malondialdehyde, succinaldehyde, glutaraldehyde, isocitric acid, aconitric acid, propane-1,2,3-tricarboxylic acid, trimesic acid, and mixtures thereof.

10. The composition according to claim 1, wherein the cross-linking agent is selected from the group consisting of: adipic acid, maleic acid, glyoxal, citric acid, and mixtures thereof.

11. The composition according to claim 1, wherein the cross-linking agent is present in an amount of 0.05 wt % to 3 wt %.

12. A method of manufacture of a biopolymer coated cellulosic article comprises the steps of:
applying an aqueous biopolymer composition as according to claim 1 to a surface of a cellulosic substrate to form a coated substrate;
allowing water to vaporise from the coated substrate to form a dry coated substrate; and
heating the dry coated substrate to cure the composition to from a biopolymer film coated article.

13. A coated article comprising a cellulosic substrate coated with a film formed from a coating composition in accordance with claim 1.

14. The composition of according to claim 1, wherein the rheology modifier is an associative thickener.

15. The composition of claim 1, wherein the stabilising agent is present in the dispersion in an amount of 2 wt % to 3 wt %.

16. An aqueous biopolymer dispersion composition comprising:
a biopolymer selected from the group consisting of:
polybutylene adipate terephthalate (PBAT), polybutylene succinate (PBS), polybutylene succinate adipate (PBSA), polylactic acid (PLA), poly (3-hydroxybutyrate) (PHB), polycaprolactone (PCL), poly (3-hydroxybutyrate-co-3-hydroxyhexanoate) (PHBH); poly (3-hydroxybutyrate-co-3-hydroxyvalerate) (PHBV), polyhydroxyalkanoate (PHA), and mixtures thereof;
a stabilising agent selected from the group consisting of:
polyvinyl alcohol, fatty alcohol ethoxylates, ethylene oxide/propylene oxide (EO/PO) block copolymers, salts of fatty acids and mixtures thereof;
a rheology modifier;
a cross-linking agent;
optional further ingredients; and
water, wherein the cross-linking agent is present in an amount of 0.05 wt % to 3 wt % of the composition.

17. The composition according to claim 16, wherein the biopolymer is present in the dispersion in the amount of 10 wt % to 80wt %.

18. The composition according to claim 16, wherein the stabilizing agent is polyvinyl alcohol.

19. A coated article comprising a cellulosic substrate coated with a film formed from a coating composition in accordance with claim 16.

* * * * *